United States Patent [19]
Majoros et al.

[11] 3,894,817
[45] July 15, 1975

[54] OSCILLATORY ARMATURE PISTON PUMP

[75] Inventors: Istvan Majoros, Baar; Franz Kiss Horvath, Lucerne, both of Switzerland

[73] Assignee: Landis & Gyr AG, Zug, Switzerland

[22] Filed: Sept. 20, 1973

[21] Appl. No.: 398,923

[30] Foreign Application Priority Data
Sept. 22, 1972 Switzerland................ 013836/72

[52] U.S. Cl................. 417/415; 417/415; 310/30
[51] Int. Cl........................................... F04b 35/04
[58] Field of Search....... 417/415, 416, 417; 310/30

[56] References Cited
UNITED STATES PATENTS

| | | | |
|---|---|---|---|
| 1,425,191 | 8/1922 | Garbarini | 417/416 |
| 3,348,489 | 10/1967 | Meyer | 417/417 |
| 3,486,456 | 12/1969 | Hager et al. | 417/416 |
| 3,597,122 | 8/1971 | Farmer | 417/417 |
| 3,606,595 | 9/1971 | Takamizawa | 417/417 |
| 3,751,188 | 8/1973 | Willinger | 417/417 |
| 3,781,140 | 12/1973 | Gladden | 417/417 |
| 3,804,558 | 4/1974 | Naito | 417/417 |

*Primary Examiner*—C. J. Husar

[57] ABSTRACT

A tubular hollow piston, including a valve, is of smaller diameter at its pressure end than its suction end and is mounted at both ends in mounting bushes. An armature is attached by web portions to the hollow piston, forming cross-sectional areas which extend hydraulically freely through the armature. The armature lies in the magnetic flux of a permanent magnet which surrounds the armature and, with the hollow piston, forms an oscillatory piston which is held in a central position by two springs when there is no current flowing. Arranged at respective ends of the armature and surrounded by energization coils are poles which, with the armature, form two further air gaps. Possible construction: the permanent magnet is a radially magnetized ring magnet; the ratio of the effective magnetic cross-section of the armature to the hydraulically effective cross-section of the hollow piston is an advantageous proportion such as 15:1; the armature and the lateral poles engage into each other without contact in the extreme limit positions of the stroke movement of the piston, and their end surfaces are of a shape to linearize the magnetic force-travel diagram.

11 Claims, 4 Drawing Figures

OSCILLATORY ARMATURE PISTON PUMP

BACKGROUND AND BRIEF DESCRIPTION OF THE INVENTION

The following two independent steps can be taken to improve the pumping output and the level of efficiency of magnetic oscillatory armature pumps operated with alternating current voltage:
1. Superimposing the permanent magnetic flux on the alternating flux; and
2. causing the pump piston to pump in both directions of movement.

Oscillatory armature systems that include a permanent magnet have been proposed in which the permanent magnet is located in the alternating magnetic flux of the energization coils. In one phase the permanent magnetic flux is weakened by the alternating flux, while in the other phase it is strengthened. In such an arrangement the permanent magnet itself is weakened by the alternating flux acting thereon, and as a consequence the alternating flux must be relatively weak, or an expensive magnet must be used.

Moreover if, as in previous convention, the oscillatory piston of an oscillatory armature pump is used directly as the magnetic armature, then its dimensions must be selected with regard to magnetic and hydraulic factors. Optimum dimensioning becomes particularly difficult when a pump which is to convey fluid in both directions of its stroke movement is intended to be used over a wide hydraulic range.

The invention is based on the problem of providing a small but easily produced pump which is particularly suitable for actuating an adjusting member of a regulating section, which operates with the highest possible efficiency, which can be used over a wide hydraulic operating range, and which conveys fluid in both directions of stroke movement of the pump piston.

In accordance with the invention, this problem is solved as follows: a hollow piston which has a different outside diameter at the suction end than at the pressure end is so arranged concentrically in an armature that a relatively large free cross-section remains between the external periphery of the hollow piston and the internal part of the armature; the armature conducts the magnetic flux and has a large magnetic cross-section relative to the hydraulically effective cross-section of the hollow piston; the hollow piston along with the armature and two springs forms an oscillatory piston which is sealingly guided in mounting bushes and in a housing and an end cover; the armature of the oscillatory piston is so enclosed by the poles of at least one permanent magnet that a first air gap which is as small as possible remains between said poles and the armature. Furthermore, the end surfaces of two stationary poles of the housing and the end cover respectively, which poles are surrounded by at least one energization coil, form with the armature two further air gaps which are larger than the first air gap and which, together with the small air gap between the armature and the poles of the permanent magnet, lie in two permanent magnet fluxes which are produced by said permanent magnet and which are closed by the housing and the end cover.

The above arrangement provides that the iron cross-section required for the magnetic circuit is substantially independent of the hydraulic dimensioning of the hollow piston and that between the armature and the hollow piston there exists a large cross-sectional area which extends hydraulically freely through the armature, for the purposes of pressure compensation in the space surrounding the hollow piston. As a result, the air gap between the permanent magnet and the armature, which should be made as small as possible for magnetic reasons, can be kept at a minimum size governed only by manufacturing considerations, without taking into account any flow of fluid which might have been necessary through that air gap.

BRIEF DESCRIPTION OF THE DRAWINGS

An embodiment of the invention is described hereinafter with reference to the accompanying drawing in which.

DETAILED DESCRIPTION

Figure 1:
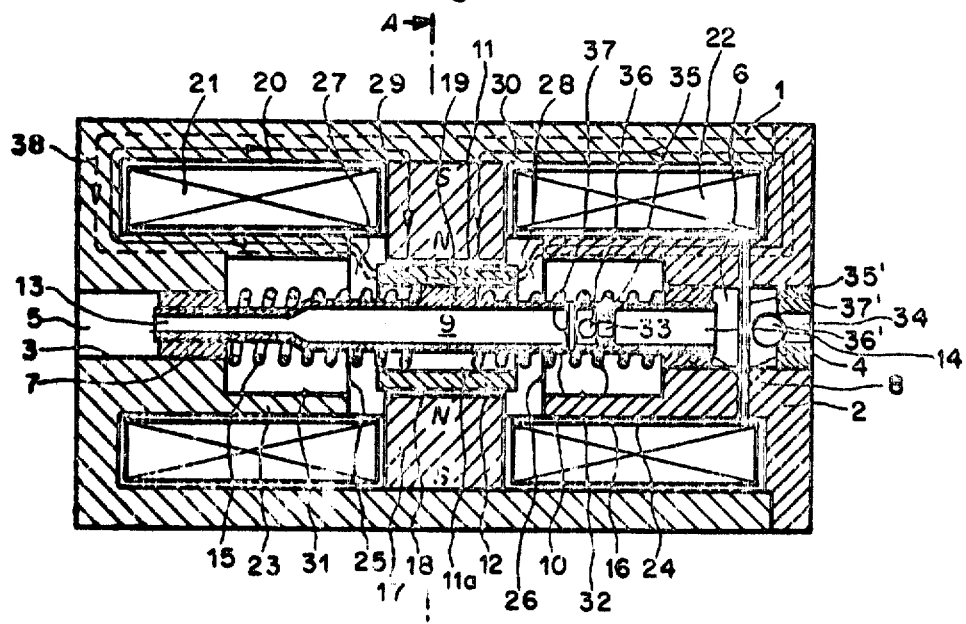
FIG. 1 shows a cross-sectional view of a piston pump with two energization coils.
Figure 4:
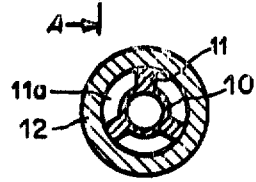
FIG. 4 shows a view in cross-section through the oscillatory piston along the line A—A in FIG. 1.

In FIG. 1, reference numeral 1 denotes a housing having an end cover 2, both comprising magnetically conducting material of circular cross-section. In their center, the housing 1 and the end cover 2 each have a bore 3 and 4 respectively. The bore 3 forms the pressure chamber 5 and the bore 4 forms the suction chamber 6 of the pump. Pressed into the bores 3 and 4 are bearing bushes 7 and 8 respectively. The bearing bushes serve to mount and seal an oscillatory piston 9 which comprises a tubular hollow piston 10 and an armature 12 which is fixedly and concentrically connected to the hollow piston 10 by way of three web portions 11. Provided between the hollow piston 10 and the armature 12 are three free cross-sectional portions 11a which extend through the armature. At its pressure end 13 which extends into the pressure chamber 5, the hollow piston 10 is of smaller diameter than at its suction end 14 which extends into the suction chamber 6. The oscillatory piston 9 and thus also the armature 12 are held by two springs 15 and 16 in the rest position, in a central position as shown in FIG. 1. A permanent magnet in the form of a radially magnetized ring magnet 17 encloses with its bore 18 the armature 12 and forms a first air gap 19 between the external cylindrical surface of the armature 12 and the bore 18. The ring magnet 17 is secured with its outer cylindrical periphery in a bore 20 in the housing 1. Two energization coils 21 and 22 are fitted on both sides of the ring magnet 17 in the same bore 20. The housing 1 and the end cover 2 extend through the energization coils 21 and 22 in the interiors thereof, in the form of annular stationary poles 23 and 24. These poles have end surfaces 25 and 26 which, with the armature 12, form two further air gaps 27 and 28 respectively. The air gaps 27 and 28 together with the air gap 19 lie in permanent magnet fluxes 29 and 30 which are produced by the ring magnet 17 and which are closed by the housing 1 and end cover 2 by way of the poles 23 and 24.

The annular shape of the poles 23 and 24 is produced by two bores 31 and 32 respectively, into which the armature 12 of the piston 9 projects without contact when the oscillatory piston 9 is in the extreme limit positions of its stroke movements.

The thin-walled hollow piston 10 has a valve 33 in its internal longitudinal bore, in its end of larger diameter. A valve 34 which is of identical construction is carried in the bore 4 of the end cover 2. These two valves comprise a bush 35, 35' which is pressed into position, a ball 36, 36', and a pin 37, 37' which is pressed into position and which limits the movement of the balls 36 and 36' respectively.

An alternatinve magnetic flux 38 produced by the flow of current through the energization coils 21 and 22 is shown in FIG. 1 by an interrupted line.

Figure 2:
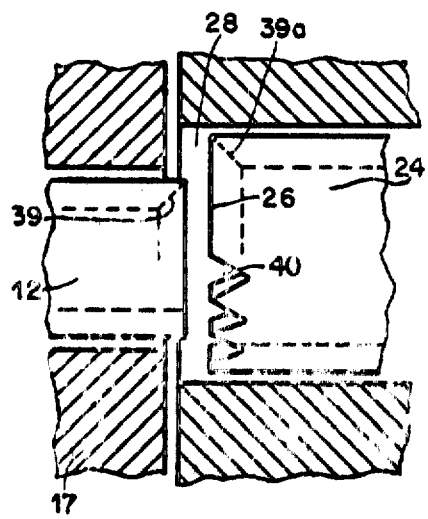
FIG. 2 is a view in partial cross-section on an enlarged scale of a detail.

FIG. 2 shows possible constructions for the end surfaces of the armature 12 and the poles 23 and 24. The ring magnet 17 is shown in cross-section, while the armature 12 and a pole 24 are shown in elevation. In the upper half of FIG. 2, the armature 12 is provided at its end surface with a tapered recess 39. The pole 24 also has a recess 39a of this type. In the lower half of the Figure, the pole 24 is provided at its end surface 26 with V-shaped notches 40.

Figure 3:
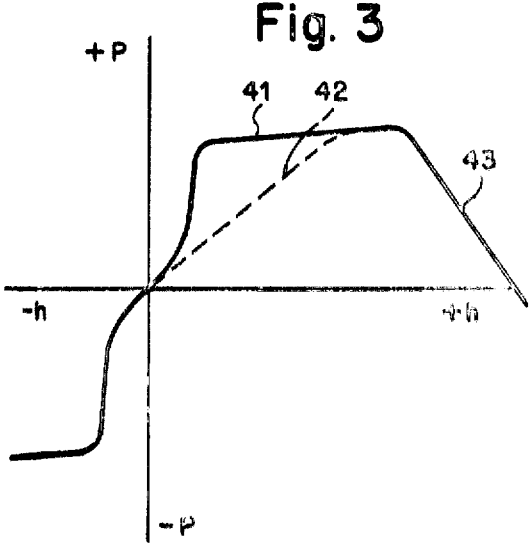
FIG. 3 is a force-travel graph.

FIG. 3 shows the force P produced on the armature 12 in its longitudinal center line by the magnetic fluxes 29, 30 and 38, over the travel distance h. The curve 41 shows the variation in the force with the construction of the air gaps 27 and 28 as shown in FIG. 1. In contrast, the broken-line curve 42 shows the nature of the force produced by the construction with the recess 39 and/or the notches 40 in FIG. 2. Reference numeral 43 denotes the falling part of the curve.

The above-described piston pump operates in the following manner: without any energization current, the two springs 15 and 16 hold the oscillatory piston 9 in a central position and the two air gaps 27 and 28 are approximately of equal size. The permanent magnet flux of the ring magnet 17 divides into the two fluxes 29 and 30 and both pass by way of the air gap 19 to the armature 12 and from there by way of the air gap 27 or 28, respectively, to the pole 23 or 24 of the housing 1 or the end cover 2, respectively, and rejoin in the outside peripheral portion of the housing 1.

The two energization coils 21 and 22 produce a common alternating magnetic flux which is closed in the poles 23 and 24 by way of the air gaps 27 and 28, the armature 12 and the outside peripheral portion of the housing 1. In practice the ring magnet 17 does not have this alternating magnetic flux 38 flowing through it, and is therefore not weakened by this alternating flux.

Hereinafter the flux 38 and the action thereof on the oscillatory piston 9 will be considered during the positive alternation: the alternating magnetic flux 38 strengthens the permanent magnet flux 30 in the air gap 28, while in the air gap 27 it acts against the permanent magnet flux 29 and thus weakens it. The equilibrium of forces on the armature 12 is eliminated and thereby the piston 9 is moved towards the right in the arrangement illustrated in FIG. 1. The resistance in the air gap 28 is reduced both for the permanent magnet flux and for the alternating magnetic flux 38 and is accordingly increased in the air gap 27. The armature 12 engages without contact and with the smallest possible air gap 28 into the bore 32 in the pole 24.

Instead of entering into the bores 31 and 32 of the poles 23 and 24 respectively, the armature 12 could also enclose on both sides without contact suitably shaped poles 23 and 24 when the armature 12 is in its respective limit positions, also with the smallest possible air gap.

Since the attractive force of a magnet varies with the square of the length of the air gap, in the present example there is an increase in the force P acting on the piston 9 over the travel distance h, in accordance with the curve 31 in FIG. 3. This rapid rise is not desirable for producing a harmonic oscillation of the oscillatory piston 9. The end part of the tubular armature 12 and/or the end surfaces 25 and 26 of the poles 23 and 24 are therefore advantageously shaped so as to linearize the magnetic force-travel characteristic. This can be achieved by a recess 39, 39a in the internal bore in the armature 12 and/or the poles 23 and 24. Pointed notches 40 can be disposed for the same purpose at the end surfaces 25 and 26 of the poles 23 and 24.

Due to the increase in the size of the air gap 27, and because the armature 12 partially moves out of the bore 18 in the ring magnet 17, the magnet force decreases again in accordance with the curve 43 and, according to particular dimensions, even attains negative values. This effect can be utilized as a magnetic brake in order to keep the oscillatory piston 9 from mechanical impact in its limit positions when running under no-load conditions.

The cross-section of the armature 12 is advantageously so selected that the armature operates in magnetic saturation. This means that, when the armature 12 suffers from eccentricity, due to manufacturing conditions, relative to the bore 18 of the annular magnet 17, there are virtually no additional transverse forces produced to act on the oscillatory piston 9 and its bearings 7 and 8.

While the above-described movement is occurring, there obviously also exists the restoring force of the working spring 16, and the pressure to be overcome from the pumping medium. Acceleration forces are also acting on the moving parts. In addition, the alternating magnetic flux 38 is not constant in operation. These forces cause retardation of the oscillatory piston 9 and re-acceleration of the piston in the other direction of movement. The piston 9 thus oscillates back and forth at the frequency of the energization current.

The hydraulic operational mode will now be considered. When the oscillatory piston 9 is accelerated towards the left in FIG. 1, the valve 33 is closed because the ball 36 is pressed against the bore in the bush 35 owing to the inertia of the ball. Because the hollow piston 10 is sealingly guided at its outer ends 13 and 14 in the bearing bushes 7 and 8, a reduced pressure is produced in the suction chamber 6 and the valve 34 is opened because the ball 36' is lifted away from the bush 35'. Medium flows through a connection conduit (not shown). At the same time, in the pressure chamber 5 the hollow piston 10 displaces into a pressure conduit (not shown) an amount of the pumping medium that corresponds to the diameter of the piston 10 at its end 13 and to its length of stroke.

When the hollow piston 10 returns —i.e., moves towards the right in FIG. 1— an increased pressure is produced in the suction chamber 6. The valve 34 is closed because the ball 36' is pressed into contact against the mouth of the bore of the bush 35'. The medium is displaced, flows through the thin-walled hollow piston 10, opens the valve 33 and passes to the pressure chamber 5. The volume which is occupied by the pressure end 13 of the hollow piston 10 in the pressure chamber 5 in the bore 3 must be replaced by the medium flowing through the hollow piston, when the hollow piston 10 returns towards the right. So that the pump can also deliver a quantity of pumping medium at the discharge conduit when it is moving towards the right, the effective piston surface area at the suction end 14 of the hollow piston 10 must be greater than the area at the pressure end 13 of the piston. The best efficiency is attained when the diameter of the hollow piston 10 at the suction end 14 is greater than that at the pressure end 13 at least approximately by the factor $\sqrt{2}$.

Since the above-described pump can be used as an immersed pump and thus can be fully immersed in the medium to be conveyed, the interior thereof is filled with the medium to be pumped. Besides the conveyance of fluid through the hollow piston, when the piston reciprocates there also occurs an exchange of the fluid in the bores 31 and 32 through the free cross-sectional area 11a. This cross-sectional area 11a is formed by the ratio of the magnetically effective cross-section of the armature 12 to the hydraulically effective cross-section of the hollow piston 10, and should be at least 2:1 and preferably 15:1.

The above-described embodiment operates with two energization coils 21 and 22. The arrangement could also be designed for only one coil. By using two coils, and by connecting them in series or in parallel, the pump affords the possibility of switching its operating voltage from, for example, 220V to 110V.

We claim:

1. In an oscillatory armature piston pump, the combination of:
    an oscillatory armature;
    a piston attached to said armature and capable of moving a fluid in accordance with the oscillatory movement thereof;
    an energization coil means for generating an alternating magnetic flux passing through said armature;
    permanent magnet means for generating a direct magnetic flux passing through said armature; and
    a magnetic circuit for so completing the flux paths for said alternating and direct magnetic fluxes that there is no substantial flow of said alternating flux through said permanent magnet, said magnetic circuit including at least one air gap for accommodating movement of said armature wherein said direct magnetic flux opposes said alternating flux during one half-cycle and aids said alternating flux during the other half-cycle.

2. An oscillatory armature piston pump according to claim 1 wherein said armature, said energization coil means, and said magnetic circuit are concentric relative to the axis of movement of said piston.

3. An oscillatory armature piston pump according to claim 2 wherein said armature is located between the poles of an air gap of said magnetic circuit, said armature and said poles being shaped to linearize the magnetic force-travel characteristic.

4. An oscillatory armature piston pump according to claim 3 wherein said linearizing effect is achieved by recessing the faces of said armature and said poles.

5. An oscillatory armature piston pump according to claim 3 wherein said linearizing effect is achieved by notching the faces of said poles.

6. An oscillatory armature piston pump according to claim 1 wherein
    said armature is
    located within an air gap of said magnetic circuit, and
    operatively mounted for oscillatory movement between a pair of poles formed by said air gap;
    said energization coil means is located to develop a magnetic field between said poles so that said alternating magnetic flux passes through said armature within said air gap; and
    said permanent magnet means is located so that said direct magnetic flux divides so that one-half flows through each of the portions of said air gap between said armature and each of said respective poles.

7. An oscillatory piston pump according to claim 6 further including at least one spring for normally maintaining said armature centered within said air gap.

8. In an oscillatory armature piston pump, the combination of
    an armature;
    electromagnetic means for imparting an oscillatory motion to said armature;
    a suction chamber;
    a pressure chamber;
    a hollow piston for achieving bi-directional pumping action having a suction end and a pressure end attached to said armature, and
    operative to form a piston for each of said chambers, said suction and pressure chambers being located at opposite ends of said hollow piston at said suction and pressure ends respectively;
    an intake valve in said suction chamber to admit fluid thereto;
    an exit valve located in said hollow piston to pass fluid from said suction chamber to said pressure chamber via said hollow piston;
    the inner piston diameter of said suction end of said hollow piston being greater than the inner diameter of said pressure end so that fluid is pumped into said pressure chamber during piston movement in both directions.

9. An oscillatory armature piston pump according to claim 8 wherein said piston diameter of said suction end is greater than the diameter of said pressure end by a factor of at least $\sqrt{2}$.

10. An oscillatory armature piston pump according to claim 8 wherein said electromagnetic means includes
    an energization coil means for generating an alternating magnetic flux passing through said armature;
    permanent magnet means for generating a direct magnetic flux passing through said armature; and
    a magnetic circuit for so completing the flux paths for said alternating and direct magnetic fluxes that there is no substantial flow of said alternating flux through said permanent magnet, said magnetic circuit including at least one air gap for accommodating movement of said armature wherein said direct magnetic flux opposes said alternating flux during one half-cycle and aids said alternating flux during the other half-cycle.

11. An oscillatory armature piston pump according to claim 7 wherein the ratio of magnetically effective cross-section of said armature to the hydraulically effective cross-section of said hollow piston is at least 2:1 and preferably 15:1.

\* \* \* \* \*